Patented Dec. 16, 1952

2,622,058

UNITED STATES PATENT OFFICE 2,622,058

AMMONIATED DENTIFRICE

Robert G. Kesel, Aurora, Ill., assignor to The University of Illinois Foundation, a nonprofit corporation of Illinois No Drawing. Application July 7, 1952,
Serial No. 297,567

5 Claims. (Cl. 167—93)

This invention relates to a dentifrice containing a non-acid salt of ammonia in sufficient quantity substantially to inhibit locabacilli and particularly to inhibit lactobacilli under naturally-occurring conditions in the human mouth.

This application is a continuation-in-part of my copending application No. 52,396, filed October 1, 1948, which in turn was a continuation-in-part of application No. 721,156, filed January 9, 1947.

Numerous dental caries studies have reported the absence of certain aciduric bacteria, particularly the absence of *Lactobacillus acidophilus* from the oral flora of individuals who have no caries. It has been shown that saliva from individuals who have active caries contains not only a large concentration of *Lactobacillus acidophilus*, but also that such saliva has the power to convert glucose rapidly into acid, whereas saliva from persons with no active caries does not. Procedures designed to test for caries activity have been developed based upon these observations.

It has heretofore been suggested by Grove and Grove, Dental Cosmos, October 1934, that ammonium hydroxide in very low concentrations would be useful in a dentifrice for the solution of dental mucin. Investigation discloses, however, that the use of ammonium hydroxide at the levels indicated and even at amounts several times the maximums indicated by Grove and Grove stimulate lactobacilli. Furthermore, because of taste and chemical action, the use of ammonium hydroxide at the higher levels is not compatible with use in the mouth.

I have invented and am herein disclosing and claiming a dentifrice for the reduction in the number of *Lactobacillus acidophilus* in the oral cavity and the prevention of the rapid conversion of glucose into acid.

It is known that cultures of saliva from caries inactive subjects develop properties inhibiting the growth of *Lactobacillus acidophilus*, while cultures of the saliva from caries active subjects develop no such inhibitory properties. It is also known that the *Lactobacillus acidophilus* has the ability of rapidly converting glucose into acid and is in a large measure responsible for this action in the saliva of caries active persons.

It was discovered that inhibiting cultures produce ammonia nitrogen, while non-inhibiting cultures produce ammonia nitrogen at a much slower rate and in lesser amounts. It was further discovered that the addition of basic ammonium salts to a sterile broth medium produces a substance whose inhibitory ability parallels that of salivary cultures having a similar ammonia nitrogen concentration. All basic ammonium salts can be used and are effective, but the most effective when used alone is ammonium carbonate. Dibasic ammonium phosphate alone has a tendency to produce a stimulating effect on the growth of some undesirable bacteria when used in concentrations of less than 1%. Acid ammonium salts have no inhibitory characteristics.

It was further discovered that many types of bacteria are present in the cultures of inhibitory saliva, but there is one bacterium, namely, *Bacterium lactis aerogenes*, consistently present. This organism has been established by me as an ammonifier acting upon the amino acids which I have found to be present in the saliva. The presence of at least twelve amino acids were found in human saliva and six deaminating systems, one of which systems is associated with *B. lactis aerogenes*—namely aspartic acid which is deaminated by ammonia by the products of *B. lactis aerogenes* and particularly asparagin. Non-inhibiting cultures from saliva of caries active subjects rarely contain the above-named bacterium. The use of the dentifrices herein described will promote the growth of this organism.

The above discoveries were made under laboratory conditions, and it was not known if the inhibiting properties of ammonia nitrogen could be successfully adapted for use in the oral cavities of humans. A dentifrice (the word "dentifrice" is herein used to include substances and compositions and solutions for introduction to the oral cavity, such as mouth washes, lozenges, chewing gum, tooth cleansers, and the like) containing a non-acid salt of ammonia will reproduce in a dentated human similar reductions in the count of *Lactobacillus acidophilus* encountered in previous laboratory experiments.

To determine the effectiveness of these preparations on the oral flora, particularly the *Lactobacillus acidophilus* content, patients were selected from the dental clinic and student body who had a large number of carious lesions. A *Lactobacillus acidophilus* count was made of their salivas and a count of 75,000 per ml. was arbitrarily chosen as an index of high caries activity. Fifty-five subjects were chosen with these or higher counts. Confirmatory tests were made on four consecutive days to make sure that the high counts were consistent. The group was divided into two sections, one a control group, and the other the experimental one. The control group consisting of ten persons was to use the preparations without the dibasic ammonium phosphate, and the experimental group was to use the ammonium containing mouth wash and powder.

The patients were instructed to brush their teeth thoroughly with the tooth powder and then to use about one tablespoonful of the mouth rinse and to move it vigorously over the entire mouth for two to three minutes. This was to be done on arising and before retiring for the night and they were also asked not to rinse the mouth with water after using the mouth rinse. No dietary or other instructions were given as it was desired to learn what the unaided effect of the ammonia might be. Patients were required to return at frequent intervals for lactobacilli counts.

The test findings are arranged in Tables I and II. The bacterial counts for lactobacilli in the saliva of each subject before the experiment commenced are shown in column A. These numbers are the average of salivary counts made on four consecutive days. The salivas were collected and were analyzed according to the Hadley method. The numbers in column B are the average of the last two lactobacilli counts made in the same manner from the same individuals after approximately five months' use of the rinse and dentifrice. The numbers in column C (Table II) are the lactobacilli counts for those of the group who continued using the powder and rinse for one year.

TABLE I
(Control group)

*Effects of five months' clinical usage of mouth rinse and dentifrice containing no ammonia on lactobacilli counts*

| Subject | A | B | Subject | A | B |
|---|---|---|---|---|---|
| 1 | 249,000 | 234,000 | 6 | 485,000 | 365,000 |
| 2 | 810,000 | 870,000 | 7 | 200,000 | 412,000 |
| 3 | 200,000 | 155,000 | 8 | 550,000 | 330,000 |
| 4 | 73,000 | 121,500 | 9 | 400,000 | 415,000 |
| 5 | 110,000 | 128,500 | 10 | 295,000 | 325,000 |

TABLE II
(Test group)

*Effects of twelve months' clinical usage of a mouth rinse and dentifrice containing ammonia on lactobacilli counts*

| Subject | A | B | C | Subject | A | B | C |
|---|---|---|---|---|---|---|---|
| 11 | 698,000 | 40,000 | No growth. | 34 | 540,500 | 70,000 | No growth. |
| 12 | 450,000 | 523,000 | | 35 | 1,250,000 | 16,000 | Do. |
| 13 | 202,000 | 75,000 | | 36 | 1,500,000 | 320,000 | 40,000. |
| 14 | 410,000 | 81,000 | 1,500. | 37 | 370,000 | 110,000 | 12,000. |
| 15 | 561,000 | No growth. | 2,500. | 38 | 260,000 | No growth. | |
| 16 | 509,000 | 74,000 | 12,500. | 39 | 145,000 | 25,000 | No growth. |
| 17 | 1,400,000 | 58,500 | | 40 | 495,000 | 160,000 | 6,000. |
| 18 | 148,000 | 42,000 | | 41 | 525,000 | 10,000 | No growth. |
| 19 | 1,500,000 | 19,000 | 110,000. | 42 | 265,000 | No growth. | 15,000. |
| 20 | 338,000 | 140,000 | | 43 | 73,000 | do | |
| 21 | 562,000 | 110,000 | 18,000. | 44 | 110,000 | 35,500 | 1,500. |
| 22 | 150,000 | 10,000 | | 45 | 280,000 | 6,500 | No growth. |
| 23 | 51,000 | 1,200 | No growth. | 46 | 1,100,000 | 110,000 | 40,000. |
| 24 | 269,000 | 16,500 | do | 47 | 750,500 | 210,000 | 10,000. |
| 25 | 675,000 | No growth. | 3,000. | 48 | 820,000 | 2,500 | No growth. |
| 26 | 375,000 | 42,000 | | 49 | 900,000 | 160,000 | 110,000. |
| 27 | 260,000 | 30,000 | | 50 | 585,000 | No growth. | 2,500. |
| 28 | 1,450,000 | 160,000 | 30,000. | 51 | 294,000 | 70,000 | 18,000. |
| 29 | 610,000 | 33,500 | No growth. | 52 | 160,500 | 250 | No growth. |
| 30 | 300,000 | 1,000 | 5,000. | 53 | 485,000 | No growth. | |
| 31 | 165,000 | 40,000 | | 54 | 315,000 | 90,000 | No growth. |
| 32 | 470,000 | 30,000 | No growth. | 55 | 755,000 | 20,500 | 2,000. |
| 33 | 900,000 | 145,000 | 15,500. | | | | |

In every instance except one the lactobacilli counts were markedly reduced in the group using the ammonia preparations whereas an increase or only a slight decrease was observed in the control group. The exception was an individual who was not cooperative in using the dentifrice and rinse. Despite the apparent huge reduction in the counts in most of the cases, it is evident that some of the counts remained relatively high.

The study was continued for approximately one year and the number of subjects was expanded to 122. The results in the additional groups have been the same, that is, invariably there is an almost immediate reduction of lactobacilli. In some individuals the organism disappeared only to reappear sporadically. Preliminary checks revealed no gingival irritation from the ammonia preparations and the teeth were notably free from materia alba and bacterial plaques.

Because of the persistent although reduced lactobacilli counts in the clinical subjects, it was decided to investigate further with ammonia liberating preparations in order to obtain a more permanent result.

Tables III to VI show the effect of a five per cent dibasic ammonium phosphate solution on total acid production, lactic acid formation, ammonia nitrogen production, and the aciduric bacterial flora, in the saliva of the same individual collected on a different day. The dibasic ammonium phosphate maintained the hydrogen ion concentration on the alkaline side in the presence of glucose although total titratable acids were developed during the forty-eight hour incubation period to almost the same level as occurred in the saliva without the ammonium phosphate. Equivalent amounts of lactic acid were produced in the saliva with and without the dibasic ammonium phosphate during forty-eight hours' incubation although the ammonia did have a reducing effect on lactic acid production as shown by the difference at the four hour period. The analyses for ammonia nitrogen revealed that there was a reduction in ammonia in the presence of dibasic ammonium phosphate for reasons we do not know. The dibasic ammonium phosphate eliminated *Lactobacillus acidophilus* from the saliva during twenty-four hours' incubation, but permitted the development of coccal organisms of the streptococcus and staphylococcus varieties. No bacteria survived the forty-eight hour incubation period.

TABLE III

*Effect of 5% dibasic ammonium phosphate solution on acid production*

| Tube | Initial | | 4 hours—37° C. | | 24 hours—37° C. | | 48 hours—37° C. | |
|---|---|---|---|---|---|---|---|---|
| | pH | T. T. acid [1] | pH | T. T. acid [1] | pH | T. T. acid [1] | pH | T. T. acid [1] |
| A | 7.0 | 0.20 | 7.1 | 0.10 | 7.2 | ------ | 7.4 | ------ |
| B | 7.0 | .20 | 4.5 | 1.50 | 4.0 | 2.60 | 3.9 | 3.00 |
| C | 7.7 | Alk. | 7.7 | Alk. | 7.7 | Alk. | 7.7 | Alk. |
| D | 7.75 | Alk. | 7.8 | Alk. | 7.4 | 1.0 | 7.0 | 2.80 |

Tube A=3 ml. saliva+5 ml. distilled water.
Tube B=3 ml. saliva+1.0 ml. 20% glucose solution+4 ml. distilled water.
Tube C=3 ml. saliva+4 ml. dibasic ammonium phosphate solution+1 ml. distilled water.
Tube D=3 ml. saliva+4 ml. dibasic ammonium phosphate solution+20% glucose solution (1 ml.).
[1] Total titratable acidity determined using N/100 NaOH.

TABLE IV

*Effect of 5% dibasic ammonium phosphate solution on lactic acid production [1]*

| Tube | Initial | 4 hours—37° C. | 24 hours—37° C. | 48 hours—37° C. |
|---|---|---|---|---|
| A | 0.146 | 0.146 | 0.146 | 0.146 |
| B | .146 | .540 | 1.345 | 1.780 |
| C | .146 | .146 | .146 | .146 |
| D | .146 | .180 | 1.338 | 1.690 |

[1] Reported in mg. per ml. tube contents.
Tube contents same as above.

TABLE V

*Effect of 5% dibasic ammonium phosphate solution on ammonium nitrogen level [1]*

| Tube | Initial | 4 hours—37° C. | 24 hours—37° C. | 48 hours—37° C. |
|---|---|---|---|---|
| A | 0.081 | 0.006 | Trace | --------- |
| B | .081 | --------- | --------- | --------- |
| C | 3.461 | 3.450 | 3.410 | 3.365 |
| D | 3.461 | 3.361 | 2.74 | 2.182 |

[1] Reported in mg. per cent per ml. tube contents.

TABLE VI

*Effect of 5% dibasic ammonium phosphate solution on aciduric flora*

| Tube | Initial colony counts | 24 hours—37° C. | 48 hours—37° C. |
|---|---|---|---|
| A | 264,000 | 245,000 | 226,000. |
| B | 248,000 | 1,600,000 | Uncountable. |
| C | 260,000 | No lactobacilli 38,000 coccal colonies. | No growth. |
| D | 270,000 | No lactobacilli 11,200 coccal colonies. | Do. |

While ammonium phosphate is preferred, other alkaline ammonium salts may be employed in its place. Ammonium carbonate is a valuable salt for this purpose, but its instability reduces its value in a dentifrice.

One formula for a mouth rinse is as follows:

| | Gm. or cc. |
|---|---|
| Dibasic ammonium phosphate | 50.0 |
| Glycerin | 100.0 |
| Liquor amaranth (U. S. P.) | 2.0 |
| Soluble saccharin | 1.0 |
| Aqua menthae piperitae, q. s. | 1,000.0 |

One formula for a tooth powder is as follows:

| | | |
|---|---|---|
| Inert polishing agent | gm | 50.0 |
| Soluble saccharin | gm | 2.0 |
| Oil of peppermint | cc | 4.0 |
| Oil of cinnamon | cc | 2.0 |
| Methyl salicylate | gm | 8.0 |
| Dibasic ammonium phosphate | gm | 50.0 |
| Precipitated calcium carbonate | gm | 884.0 |

It has heretofore been proposed to employ ammonium hydroxide in a dentifrice for the purpose of dissolving mucin plaques from the teeth by the use of very small proportions of ammonia. Such proportions are not effective to destroy lactobacilli and, in fact, may encourage their growth.

If the amount of ammonium salt used is too small, it may likewise encourage the growth of the bacteria rather than their control.

While ammonium carbonate is apparently the most effective salt of ammonia in small concentrations, it is unstable and, therefore, it is not particularly desirable in a dentifrice which is to be sold on the market and may have to be stored for a considerable period of time. Its palatability is likewise not of the highest order.

Dibasic ammonium phosphate has proved to be by far the most important and desirable salt of ammonia. This material has not heretofore been suggested for use as a dentifrice ingredient. It may be employed as the sole ammonia producing ingredient or it may be fortified by other salts of ammonia, so long as the dentifrice provides a non-acid integration of the whole.

Small amounts of dibasic ammonium phosphate in the oral environment can cause a stimulation of the growth of lactobacilli and it is, therefore, important that the dentifrice should contain sufficient of the material that under normal conditions of use and dosage the bacteria will be inhibited rather than stimulated.

It is obvious that the proportions in the dentifrice itself depend somewhat upon the dosage of the dentifrice to be employed since the saliva dilutes the dentifrice and this must be taken into consideration. For example, a powder is normally used in less amount than a paste and for that reason it may be desirable to employ a higher or at least a greater margin of safety in a powder than in a paste. I have found, however, that usage of 5% dibasic ammonium phosphate, either in a powder or in a paste, produces the most satisfactory, all around results.

Under carefully controlled conditions, a powder dentifrice having 3% dibasic ammonium phosphate exerts extraordinary control of the bacteria and I have in some cases found an improved control at 3% as compared to 5%. The 5% level is preferred, however, because of stability factors and margin of safety.

Above 5%, the limiting factor is largely one of taste and palatability. Normally, any amounts above 5% may be considered as unnecessary diluents or extenders. It is theoretically possible to employ a dentifrice with say 10% of dibasic ammonium phosphate, using only a half dose to produce an ultimate solution in the mouth in the same order as that which would be produced by using twice as much of the 5% material. However, up to the present this has proved impracticable because of the palatability factor.

I have found that the lower range for dibasic ammonium phosphate for safe use is above 1%. A dentifrice powder including 1% dibasic ammonium phosphate will exert inhibitory control of lactobacilli in some individuals. It may be considered as borderline control at this level, and it is possible that the determining factor is the dilution which occurs in the mouth of the patient.

Excellent results have been obtained in all patients treated using a powder containing 2% of dibasic ammonium phosphate allowing for ordinary dilution in the mouth. I thus prefer to use not substantially less than 2% of the material in a dentifrice powder.

In a paste the amount of material employed may be increased and thus the dilution factor reduced. Nevertheless, even in a paste I do not prefer to use substantially less than 2% of the material in order to have a safe working margin and to provide for possible loss of effectiveness of the dentifrice over periods of time.

It is highly useful to employ urea with the non-acid ammonium salt. Mixtures of 2% dibasic ammonium phosphate plus 2% of urea exert excellent control. The combination of 5% dibasic ammonium phosphate with 3% urea as disclosed in Wach Patent No. 2,542,886 is particularly advantageous. Amounts of urea above approximately 10% exert an effect which is at least temporarily deleterious to certain functions of the oral environment, with the result that there is at least a considerable lag in lactobacilli control. However, the use of such higher proportions of urea does not overcome the valuable functions of the dibasic ammonium phosphate under most conditions.

With ammonium carbonate, lower proportions may exert control and as little as 1% in solution is highly inhibitory. Even with this compound, however, the preferred range is not substantially less than 2% in order to exert effective control over long periods of time, particularly since the salt is highly unstable and cannot be counted upon to remain at its original proportion.

A series of tests were conducted on subjects to determine the effectiveness of water, a non-ammoniated dentifrice and different concentrations of dibasic ammonium phosphate in toothpowders on the *Lactobacillus acidophilus* content of the subjects' saliva. The following procedure, devised and carried out by Dr. Joseph F. O'Donnell of the University of Illinois College of Dentistry, was employed.

For each test, subjects were selected from the University of Illinois Dental Clinic and student body whose lactobacilli count per c. c. of saliva exceeded 10,000 and who had not used previously an ammoniated dentifrice. For each test, the subject was permitted to rinse his mouth upon waking in the morning before eating his breakfast. Within from 45 to 60 minutes after eating breakfast, he submitted the first of five 2 c. c. samples of saliva in a sterile container. The subject then brushed his teeth vigorously for one minute with the particular type of toothpowder to be tested, using from 1 to 1.5 grams of the toothpowder. After spitting out the excess liquid in his mouth resulting from the brushing, the subject then submitted the second sample of his saliva, which is the saliva sample taken immediately after brushing. The subject then submitted three other samples of his saliva, one taken 5 minutes after the second sample, one taken 30 minutes after the 5 minute sample, and one taken 90 minutes after the 30 minute sample. For the series of tests in which tap water was employed instead of toothpowder, each subject rinsed his mouth for one minute after brushing while moving 20 c. c. of tap water vigorously over the entire mouth and then submitted the second sample of saliva.

To avoid any possible action of the medicaments in the toothpowders which may have been in contact with the saliva of the samples submitted, the first three samples were cultured immediately on collection.

The saliva samples were cultured and analyzed according to the Faith Hadley technique. After thoroughly mixing a 2 c. c. sample of the collected saliva in order to break up any clumps of bacteria, 1 c. c. of the saliva was added to 4 c. c. of distilled, sterile water. 0.1 c. c. of this diluted saliva was then deposited on Tomato Agar having a pH of 5 and spread uniformly thereover, allowed to stand for 10 minutes at room temperature, and then incubated for 4 days at a temperature of about 37° C. After incubation, the lactobacilli colonies were counted.

The test findings have been arranged in Tables VII to XII. The bacterial count in thousands for lactobacilli per c. c. of saliva of each subject 45 to 60 minutes after eating breakfast and before brushing are shown in columns B. The lactobacilli counts in thousands immediately after brushing are shown in columns A; the lactobacilli counts in thousands 5 minutes after brushing are shown in the columns designated "5 Min.," the lactobacilli counts in thousands 30 minutes after the 5 minute samples are shown in the columns designated "30 Min.," and the lactobacilli counts in thousands 90 minutes after the 30 minute samples are shown in columns designated "90 Min."

Table VII in column 8 shows the effect of brushing and rinsing with tap water on the lactobacilli count in the mouth.

Table VIII in column 9 shows the effect of brushing with a non-ammoniated dentifrice on the lactobaccilli count in the mouth.

Tables IX to XII in columns 9 and 10 show the effect of brushing with an ammoniated toothpowder containing 1%, 2%, 3% and 5% dibasic ammonium phosphate respectively on the lactobacilli count in the mouth.

TABLE VII

*Effect of brushing and rinsing with tap water on lactobacilli counts*

| Subject No. | B | A | Percent diff. | 5 min. | Percent diff. | 30 min. | Percent diff. | 90 min. | Percent diff. |
|---|---|---|---|---|---|---|---|---|---|
| 1 | 24.65 | 83.5 | 222.0 | 58.0 | 135.0 | 58.0 | 135.0 | 54.2 | 119.0 |
| 2 | 21.1 | 17.0 | −19.4 | 21.5 | 1.9 | 18.45 | 12.5 | 25.15 | 19.2 |
| 3 | 11.75 | 20.5 | 74.5 | 12.15 | 3.4 | 10.1 | −14.1 | 15.05 | 28.1 |
| 4 | 152.5 | 225.0 | 47.5 | 200.0 | 31.2 | 183.0 | 20.3 | 148.5 | −2.6 |
| 5 | 21.5 | 18.5 | −14.0 | 23.0 | 7.0 | 20.0 | −5.3 | 20.05 | −5.3 |
| 6 | 55.0 | 80.3 | 46.4 | 52.0 | −5.5 | 60.0 | 9.1 | 63.0 | 14.5 |
| 7 | 140.0 | 80.4 | −42.5 | 100.1 | −28.6 | 110.0 | −21.4 | 155.0 | 10.7 |
| 8 | 21.0 | 59.0 | 181.0 | 27.0 | 28.6 | 31.65 | 51.0 | 22.5 | 7.1 |
| 9 | 7.2 | 16.0 | 122.0 | 9.0 | 25.0 | 9.8 | 36.0 | 12.5 | 72.0 |
| 10 | 104.0 | 123.0 | 18.3 | 94.5 | −9.1 | 67.5 | −35.0 | 106.0 | 1.9 |
| 11 | 122.0 | 133.0 | 9.0 | 120.0 | 1.6 | 155.0 | 27.0 | 105.0 | 13.9 |
| 12 | 25.0 | 21.1 | −15.6 | 22.05 | −11.8 | 26.0 | 4.0 | 38.0 | 52.0 |
| 13 | 77.0 | 137.0 | 78.0 | 121.0 | 57.0 | 119.0 | 54.5 | 125.0 | 62.4 |
| 14 | 59.0 | 85.0 | 44.0 | 87.0 | 47.4 | 110.5 | 86.5 | 116.0 | 96.5 |
| 15 | 60.0 | 150.0 | 150.0 | 170.0 | 187.0 | 160.0 | 167.0 | 75.0 | 25.0 |
| 16 | 15.0 | 25.5 | 70.0 | 50.0 | 233.0 | 35.25 | 135.0 | 25.05 | 67.0 |
| 17 | 704.0 | ¹T | | ¹T | | ¹T | | 675.0 | 4.1 |
| 18 | 35.0 | 22.5 | −35.7 | 27.0 | −22.8 | 37.0 | 5.7 | 45.0 | 28.6 |
| 19 | 25.6 | 75.8 | 196.0 | 55.5 | 117.0 | 35.45 | 38.4 | 32.9 | 28.5 |
| 20 | 127.0 | 205.9 | 62.0 | 93.7 | 26.2 | 81.6 | 34.9 | 144.1 | 13.45 |
| 21 | 603.4 | 302.5 | −51.4 | 350.9 | −42.0 | 821.0 | 36.1 | 685.5 | 13.7 |
| 22 | 182.5 | 123.0 | −32.6 | 243.5 | 33.4 | 211.7 | 16.0 | 172.2 | −5.65 |
| 23 | 5.2 | 7.0 | 34.6 | 5.0 | −3.9 | 5.0 | −3.9 | 6.5 | 25.0 |
| 24 | 38.5 | | | 30.1 | −21.8 | 52.1 | 35.3 | 52.15 | 35.4 |
| 25 | 140.0 | 80.35 | −42.5 | 100.1 | 28.5 | 110.0 | −21.4 | 155.0 | 10.7 |

¹ The number of lactobacilli colonies were too numerous to count.

TABLE VIII

*Effect of brushing with non-ammoniated toothpowder [1] on lactobacilli counts*

| Subject No. | B | A | 5 min. | Percent diff. | 30 min. | Percent diff. | 90 min. | Percent diff. |
|---|---|---|---|---|---|---|---|---|
| 1 | 18.7 | 100.0 | 435.0 | 61.0 | 226.0 | 33.0 | 74.9 | 25.1 | 34.2 |
| 2 | 16.3 | 29.0 | 77.9 | 41.0 | 152.0 | 12.5 | −23.3 | 16.5 | 1.23 |
| 3 | 12.1 | 26.0 | 115.0 | 22.65 | 87.2 | 8.25 | −31.8 | 14.25 | 17.8 |
| 4 | 152.5 | 225.0 | 47.5 | 200.0 | 31.2 | 183.0 | 19.7 | 148.45 | −2.65 |
| 5 | 23.0 | 75.0 | 226.0 | 26.0 | 13.0 | 25.0 | 8.7 | 30.0 | 30.4 |
| 6 | 42.0 | 75.4 | −79.5 | 32.0 | 23.8 | 35.0 | 16.7 | 45.0 | 7.14 |
| 7 | 35.0 | 60.0 | 71.5 | 40.0 | 14.3 | 23.5 | −32.9 | 35.5 | 1.43 |
| 8 | 13.75 | 44.0 | 222.0 | 23.2 | 68.6 | 29.5 | 114.5 | 17.0 | 23.6 |
| 9 | | | | | | | | | |

[1] Ingredients of non-ammoniated toothpowder employed:

| | | |
|---|---|---|
| Calcium phosphate | gm | 10.0 |
| Soluble saccharin | gm | 0.4 |
| Menthol | gm | 0.4 |
| Calcium carbonate precipitate | gm | 189.2 |
| Oil of peppermint | cc | 0.4 |
| Oil of cinnamon | cc | 0.4 |
| Oil of wintergreen | cc | 1.2 |
| Sodium lauryl sulfate | gm | 2.0 |

TABLE IX

*Effect of brushing with ammoniated toothpowder [1] containing 1% dibasic ammonium phosphate*

| Subject No. | B | A | 5 min. | 30 min. | Percent diff. | 90 min. | Percent diff. |
|---|---|---|---|---|---|---|---|
| 1 | 15.5 | 95.0 | 48.0 | 72.0 | 364.0 | 8.75 | −43.5 |
| 2 | 32.35 | [2] T | [2] T | 35.5 | 9.74 | 30.2 | −6.64 |
| 3 | 105.2 | 172.75 | 177.75 | 14.25 | −86.5 | 8.75 | −91.5 |
| 4 | 65.2 | 91.7 | 100.55 | 26.05 | −60.0 | 21.15 | −66.5 |
| 5 | | | | | | | |
| 6 | 16.0 | 65.15 | 85.1 | 2.7 | −83.2 | .9 | −94.5 |
| 7 | | | | | | | |
| 8 | 9.85 | 75.0 | 16.0 | 8.0 | −18.8 | 8.0 | −18.8 |
| 9 | | | | | | | |

[1] Ingredients of ammoniated toothpowder employed:

| | | |
|---|---|---|
| Dibasic ammonium phosphate | gm | 1.0 |
| Calcium phosphate | gm | 5.0 |
| Soluble saccharin | gm | 0.2 |
| Menthol | gm | 0.2 |
| Calcium carbonate precipitate | gm | 86.6 |
| Oil of peppermint | cc | 0.2 |
| Oil of cinnamon | cc | 0.2 |
| Oil of wintergreen | cc | 0.6 |
| Sodium lauryl sulfate | gm | 1.0 |

[2] The number of lactobacilli colonies were too numerous to count.

TABLE X

*Effect of brushing with ammoniated toothpowder [1] containing 2% dibasic ammonium phosphate*

| Subject No. | B | A | 5 min. | 30 min. | Percent diff. | 90 min. | Percent diff. |
|---|---|---|---|---|---|---|---|
| 1 | 250.0 | 310.0 | 183.0 | 126.5 | −49.4 | 181.0 | −27.6 |
| 2 | 19.15 | [2] T | [2] T | 12.0 | −37.3 | 6.0 | −68.6 |
| 3 | 62.5 | 89.0 | 10.0 | .45 | −99.3 | 10.15 | −83.6 |
| 4 | 31.5 | 186.15 | | 1.95 | −93.6 | .5 | −98.5 |
| 5 | | | | | | | |
| 6 | 25.2 | 35.15 | 50.1 | 1.0 | −96.0 | .2 | −99.2 |
| 7 | | | | | | | |
| 8 | 24.0 | 52.0 | 13.5 | 6.2 | −74.2 | 2.6 | −89.2 |
| 9 | | | | | | | |

[1] Ingredients of ammoniated toothpowder employed:

| | | |
|---|---|---|
| Dibasic ammonium phosphate | gm | 1.92 |
| Calcium phosphate | gm | 5.0 |
| Soluble saccharin | gm | 0.2 |
| Menthol | gm | 0.2 |
| Calcium carbonate precipitate | gm | 86.6 |
| Oil of peppermint | cc | 0.2 |
| Oil of cinnamon | cc | 0.2 |
| Oil of wintergreen | cc | 0.6 |
| Sodium lauryl sulfate | gm | 1.0 |

[2] The number of lactobacilli colonies were too numerous to count.

TABLE XI

*Effect of brushing with ammoniated toothpowder [1] containing 3% dibasic ammonium phosphate*

| Subject No. | B | A | 5 min. | 30 min. | Percent diff. | 90 min. | Percent diff. |
|---|---|---|---|---|---|---|---|
| 1 | 55.5 | 73.0 | 7.0 | 2.9 | −94.9 | 3.6 | −93.5 |
| 2 | 20.15 | [2] T | 65.0 | 3.6 | −82.3 | 1.0 | −95.3 |
| 3 | 85.0 | 130.5 | 41.0 | .9 | −99.0 | 1.3 | −98.5 |
| 4 | 135.0 | 206.15 | 81.5 | 26.5 | −80.4 | 41.0 | −69.6 |
| 5 | | | | | | | |
| 6 | 58.1 | 25.0 | 16.5 | 8.0 | −86.2 | .2 | −99.7 |
| 7 | | | | | | | |
| 8 | 20.0 | 50.0 | 12.0 | 6.0 | −70.0 | 1.1 | −94.5 |
| 9 | | | | | | | |

[1] Ingredients of ammoniated toothpowder employed:

| | | |
|---|---|---|
| Dibasic ammonium phosphate | gm | 2.91 |
| Calcium phosphate | gm | 5.0 |
| Soluble saccharin | gm | 0.2 |
| Menthol | gm | 0.2 |
| Calcium carbonate precipitate | gm | 86.6 |
| Oil of peppermint | cc | 0.2 |
| Oil of cinnamon | cc | 0.2 |
| Oil of wintergreen | cc | 0.6 |
| Sodium lauryl sulfate | gm | 1.0 |

[2] The number of lactobacilli colonies were too numerous to count.

TABLE XII

*Effect of brushing with ammoniated toothpowder [1] containing 5% dibasic ammonium phosphate*

| Subject No. | B | A | 5 min. | 30 min. | Percent diff. | 90 min. | Percent diff. |
|---|---|---|---|---|---|---|---|
| 26 | 26.1 | 76.5 | 40.1 | 20.0 | −23.4 | 10.15 | −61.2 |
| 27 | 65.2 | 91.7 | 100.55 | 26.05 | −60.3 | 21.15 | −67.6 |
| 28 | 30.3 | 65.1 | 20.5 | 10.2 | −66.4 | 10.55 | −65.2 |
| 29 | 29.0 | 250.0 | 41.0 | 10.5 | −63.7 | 1.6 | −94.4 |
| 1 | 35.2 | 53.0 | 16.0 | 3.75 | −89.4 | .4 | −98.8 |
| 6 | 41.0 | 60.0 | 25.0 | 16.0 | −60.9 | .6 | −98.5 |

[1] Ingredients of ammoniated toothpowder employed:

| | | |
|---|---|---|
| Dibasic ammonium phosphate | gm | 10.0 |
| Calcium phosphate | gm | 10.0 |
| Soluble saccharin | gm | 0.4 |
| Menthol | gm | 0.4 |
| Calcium carbonate precipitate | gm | 179.2 |
| Oil of peppermint | cc | 0.4 |
| Oil of cinnamon | cc | 0.4 |
| Oil of wintergreen | cc | 1.2 |
| Sodium lauryl sulfate | gm | 2.0 |

From the data in Tables VII and VIII, it is readily seen that brushing with either tap water or a non-ammoniated dentifrice fails to effectively reduce the lactobacilli in the saliva. Instead, the lactobacilli count of practically all of the patients increased over a period of 125 minutes after brushing with either tap water or a non-ammoniated dentifrice.

On the other hand, brushing in the manner previously described with a toothpowder containing the same ingredients employed in obtaining the results in Table VIII, but in addition having 1% dibasic ammonium phosphate, exerts some inhibitory control over lactobacilli. This is evident from the data in Table IX. However, the inhibitory effect of an ammoniated toothpowder containing 1% dibasic ammonium phosphate is marginal. After the 125 minute test period, the lactobacilli count of only two of the subjects was reduced by more than 90% of the count prior to brushing, whereas one of the subject's count was only reduced 6.6% and another only 18.8%, while the remaining two subjects had a lactobacilli reduction of 43.5% to 66.5%.

As readily seen from Tables X to XII, excellent results were obtained using concentrations of from 2% to 5% dibasic ammonium phosphate in the toothpowder.

The foregoing detailed description is given for clearness of understanding only, and no unnecessary limitations should be understood therefrom, for some modifications will be obvious to those skilled in the art.

I claim:

1. A dentifrice comprising a non-toxic carrier adapted for oral administration and dibasic ammonium phosphate in proportion to provide under conditions of use in the mouth a concentration in the saliva sufficient to inhibit lactobacilli and being not substantially less than 2% of the composition, and a flavor masking ingredient.

2. A dentifrice comprising a non-toxic, palatable carrier adapted for oral administration containing dibasic ammonium phosphate in proportion to provide under conditions of use in the mouth a concentration in the saliva sufficient to inhibit lactobacilli and being not substantially less than 2% of the composition, and a flavor masking ingredient.

3. A dentifrice comprising a non-toxic, palatable carrier adapted for oral administration containing dibasic ammonium phosphate in proportion to provide under conditions of use in the mouth a concentration in the saliva sufficient to inhibit lactobacilli and being not substantially less than 2% of the composition, a polishing agent, and a flavor masking ingredient.

4. A non-liquid dentifrice comprising a non-toxic, palatable carrier adapted for oral administration containing dibasic ammonium phosphate in proportion to provide under conditions of use in the mouth a concentration in the saliva sufficient to inhibit lactobacilli and being not substantially less than 2% of the composition, and a flavor masking ingredient.

5. A dentifrice comprising a non-toxic, palatable carrier adapted for oral administration containing dibasic ammonium phosphate in an amount of from 2-5% of the composition and in proportion to provide under conditions of use in the mouth a concentration in the saliva sufficient to inhibit lactobacilli, and a flavor masking ingredient.

ROBERT G. KESEL.

REFERENCES CITED

The following references are of record in the file of this patent:

UNITED STATES PATENTS

| Number | Name | Date |
|---|---|---|
| 1,377,780 | Lane | May 10, 1921 |
| 1,717,723 | McCall | June 18, 1929 |
| 1,969,340 | Vogt | Aug. 7, 1934 |
| 2,207,074 | Smith | July 7, 1940 |
| 2,452,054 | Jones | Oct. 26, 1948 |

FOREIGN PATENTS

| Number | Country | Date |
|---|---|---|
| 291,565 | Germany | Apr. 22, 1916 |
| 342,654 | Great Britain | Jan. 28, 1931 |
| 803,161 | France | June 29, 1936 |

OTHER REFERENCES

Grove: "The Biochemical Aspect of Dental Caries," The Dental Cosmos, October 1934, pages 1029 to 1036.

The Journal of the Society of Cosmetic Chemists, "Dental Caries Symposium," December 1950, volume II, Number 2, pages 57 to 87.

The Manufacturing Chemist and Manufacturing Perfumer (1), November 1949, pages 527 and 528.

The Manufacturing Chemist (2), July 1950, page 297.

The Drug and Cosmetic Industry, September 1949, page 264.

The American Journal of Pharmacy, July 1949, page 267.

The Military Surgeon (1), May 1950, pages 352 to 354.

The Military Surgeon (2), May 1950, pages 345 to 347.

The Biochemical Journal, June-July 1950, pages 60 to 63.

Manufacturing Chemist and Perfumer, June 1942, page 140.

Stephan et al.: "Effectiveness of Urea and of Synthetic Detergents in Reducing Activity of Human Dental Caries," Proc. Soc. Exp. Biol. & Med., February 1944, pages 101 to 104.

The American Perfumer, Sec. 1, July 1949, pages 29 and 31.

The Washington Post, May 11, 1949, "Dentists Told Only Fluorine Averts Decay."